United States Patent
Sequeira

(10) Patent No.: US 7,315,567 B2
(45) Date of Patent: Jan. 1, 2008

(54) METHOD AND APPARATUS FOR PARTIAL INTERFERENCE CANCELLATION IN A COMMUNICATION SYSTEM

(75) Inventor: Raul E Sequeira, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 793 days.

(21) Appl. No.: 09/875,474

(22) Filed: Jun. 6, 2001

(65) Prior Publication Data

US 2002/0021747 A1    Feb. 21, 2002

Related U.S. Application Data

(60) Provisional application No. 60/217,441, filed on Jul. 10, 2000.

(51) Int. Cl.
*H04B 1/00* (2006.01)

(52) U.S. Cl. ............... 375/148; 375/136; 375/142; 375/143; 375/144; 375/147; 375/150; 375/346

(58) Field of Classification Search ........... 375/148, 375/229–236; 714/795
See application file for complete search history.

(56) References Cited

U.S. PATENT DOCUMENTS

| | | | |
|---|---|---|---|
| 3,622,995 A | 11/1971 | Dilks et al. | |
| 4,375,097 A | 2/1983 | Ulug | |
| 4,862,357 A | 8/1989 | Ahlstrom et al. | |
| 5,021,953 A | 6/1991 | Webber et al. | |
| 5,195,130 A | 3/1993 | Weiss et al. | |
| 5,225,990 A | 7/1993 | Bunce et al. | |
| 5,237,499 A | 8/1993 | Garback | |
| 5,331,546 A | 7/1994 | Weber et al. | |
| 5,401,944 A | 3/1995 | Bravman et al. | |
| 5,521,966 A | 5/1996 | Friedes et al. | |
| 5,570,283 A | 10/1996 | Shoolery et al. | |
| 5,598,477 A | 1/1997 | Berson | |
| 5,724,520 A | 3/1998 | Goheen | |
| 5,732,398 A | 3/1998 | Tagawa | |
| 5,757,791 A * | 5/1998 | Kanterakis et al. | ......... 370/342 |
| 5,764,981 A | 6/1998 | Brice et al. | |
| 5,781,892 A | 7/1998 | Hunt et al. | |
| 5,793,639 A | 8/1998 | Yamazaki | |
| 5,832,453 A | 11/1998 | O'Brien | |
| 5,832,454 A | 11/1998 | Jafri et al. | |
| 5,864,818 A | 1/1999 | Feldman | |
| 5,866,888 A | 2/1999 | Bravman | |
| 5,884,271 A | 3/1999 | Pitroda | |
| 5,897,620 A | 4/1999 | Walker et al. | |
| 5,906,946 A | 5/1999 | Sausa et al. | |
| 5,912,981 A | 6/1999 | Hansmire et al. | |

(Continued)

OTHER PUBLICATIONS

Divsalar et al. "Improved Parallel Interference Cancellation for CDMA", IEEE Transactions on Communications, vol. 46, No. 2, Feb. 199, pp. 258-268.*

(Continued)

*Primary Examiner*—Curtis Odom

(57) ABSTRACT

A method of partial interference cancellation of a received signal that includes a first data component and a second data component is disclosed. The method includes the steps of determining a characteristic of the communication channel, estimating a factor based upon the characteristic, using the factor to cancel the second data component from the signal, and recovering the first data component from the signal.

4 Claims, 4 Drawing Sheets

U.S. PATENT DOCUMENTS

| | | | |
|---|---|---|---|
| 5,914,671 A | 6/1999 | Tuttle | |
| 5,920,053 A | 7/1999 | DeBrouse | |
| 5,926,798 A | 7/1999 | Carter | |
| 5,948,040 A | 9/1999 | DeLorme et al. | |
| 5,953,705 A | 9/1999 | Oneda | |
| 5,953,706 A | 9/1999 | Patel | |
| 6,003,009 A | 12/1999 | Nishimura | |
| 6,012,161 A * | 1/2000 | Ariyavisitakul et al. | 714/795 |
| 6,018,715 A | 1/2000 | Lynch et al. | |
| 6,023,679 A | 2/2000 | Acebo et al. | |
| 6,038,551 A | 3/2000 | Barlow et al. | |
| 6,044,353 A | 3/2000 | Pugliese, III | |
| 6,085,976 A | 7/2000 | Sehr | |
| 6,101,241 A | 8/2000 | Boyce et al. | |
| 6,101,477 A | 8/2000 | Hohle et al. | |
| 6,105,010 A | 8/2000 | Musgrave | |
| 6,108,636 A | 8/2000 | Yap et al. | |
| 6,119,096 A | 9/2000 | Mann et al. | |
| 6,119,932 A | 9/2000 | Maloney et al. | |
| 6,122,620 A | 9/2000 | Weber | |
| 6,122,642 A | 9/2000 | Mehovic | |
| 6,144,848 A | 11/2000 | Walsh et al. | |
| 6,158,658 A | 12/2000 | Barclay | |
| 6,199,077 B1 | 3/2001 | Inala et al. | |
| 6,229,621 B1 | 5/2001 | Kulakowski et al. | |
| 6,233,683 B1 | 5/2001 | Chan et al. | |
| 6,249,767 B1 | 6/2001 | Okayama et al. | |
| 6,275,808 B1 | 8/2001 | DeMarcken | |
| 6,289,315 B1 | 9/2001 | Calvi | |
| 6,292,830 B1 | 9/2001 | Taylor et al. | |
| 6,295,521 B1 | 9/2001 | DeMarcken et al. | |
| 6,304,850 B1 | 10/2001 | Keller et al. | |
| 6,314,402 B1 | 11/2001 | Monaco et al. | |
| 6,317,594 B1 | 11/2001 | Gossman et al. | |
| 6,324,517 B1 | 11/2001 | Bingham et al. | |
| 6,385,185 B1 * | 5/2002 | Huang | 370/342 |
| 6,400,750 B1 * | 6/2002 | Lee et al. | 375/130 |
| 6,473,417 B1 * | 10/2002 | Herzog | 370/342 |
| 6,904,109 B1 * | 6/2005 | Hottinen | 375/346 |
| 6,963,546 B2 * | 11/2005 | Misra et al. | 370/294 |

OTHER PUBLICATIONS

Merriam-Webster's Collegiate Dictionary (Tenth Edition), p. 396.*

* cited by examiner

METHOD AND APPARATUS FOR PARTIAL INTERFERENCE CANCELLATION IN A COMMUNICATION SYSTEM

REFERENCE(S) TO RELATED APPLICATION(S)

The present application claims priority from provisional application, Ser. No. 60/217,441, entitled "METHOD AND APPARATUS FOR PARTIAL INTERFERENCE CANCELLATION IN A COMMUNICATION SYSTEM," filed Jul. 10, 2000, which is commonly owned and incorporated herein by reference in its entirety.

FIELD OF THE INVENTION

The present invention relates generally to communication systems including wireless communication systems, and more particularly, to a method and apparatus for providing partial interference cancellation in a wireless communication system.

BACKGROUND OF THE INVENTION

Wireless communication systems including those based on direct sequence spread spectrum (DSSS) code division multiple access (CDMA) technology offer many benefits for cellular radio communications. In conventional CDMA receivers, known as single-user detectors (SUD), each user's data is estimated without consideration of the other users that are communicating simultaneously. The other users appear as background noise. These conventional receivers typically utilize simple correlation receivers that correlate the received signal with a synchronized copy of the desired user's spreading signal. An alternate approach is to employ a multi-user detector (MUD) that simultaneously demodulates all users within a CDMA bandwidth.

Consideration of the other users in detecting a particular user's signal can significantly improve the receiver's performance metrics. The improvement in performance of the MUD over the SUD is manifested either as a reduction in the required energy per bit ($E_b$) for a specified quality of service (QoS) for a fixed number of users, or as an increase in the number of users supported at the specified QoS of the same $E_b$. While the former offers the potential benefit of extending the lifetime of subscriber unit (mobile station) batteries and of reducing the overall interference in a CDMA cellular system, the latter represents a potential increase in the capacity of the system.

There are several design approaches for a MUD receiver. One approach is to remove from the received signal the estimated contribution of the other users, or what is referred to as the multiple-access interference (MAI). The estimated MAI may be entirely removed in a "brute-force" interference cancellation (IC) approach or only partially removed in so-called partial interference cancellation (PIC). The user's transmitted information is then estimated from the "cleaned" signal. Receivers that incorporate MAI reduction, or IC, are known as subtractive MUD. The performance of these receivers depends on the quality of the MAI estimates. The performance of these receivers also depends on the partial interference coefficients used to estimate the received signal. If the estimates are poor, the job of suppressing MAI may turn out to be ineffective. It is typical that hard estimates and fixed brute-force coefficients are used, which in some cases, may cause the MUD to perform worse than a conventional SUD.

Thus, there is a need for a method and apparatus for partial interference cancellation in a communication system, and particularly, for method and apparatus for enhancing the quality of the data estimates and cancellation coefficients utilized in providing partial interference cancellation.

DETAILED DESCRIPTION OF THE PREFERRED EMBODIMENTS

In a method according to a preferred embodiment of the invention, despread data is utilized to generate soft estimates of multi-user data on a power control group (PCG) by power control group basis. The soft data estimates are made based upon a signal-to-noise ratio estimate and an applied functional approximation. The soft data estimates are then used in a multi-access interference cancellation approach to improve the estimation of the coded information sequence, d, for a particular user.

In a method according to an alternate preferred embodiment of the invention, despread data is utilized to determine partial interference cancellation coefficients that are utilized in a partial interference cancellation approach to improve the estimation of the coded information sequence, d, for a particular user.

In one preferred embodiment of the invention, the applied functional approximation is a piece-wise linear approximation of the hyperbolic tangent function (tanh). In another preferred embodiment of the invention, the applied functional approximation is a piece-wise linear approximation of a probability error function.

Figure 1:
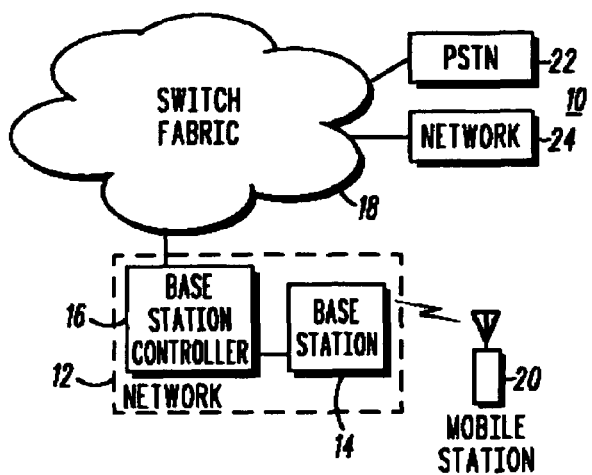
FIG. 1 is a block diagram representation of a communication system that may be adapted in accordance with a preferred embodiment of the invention.

Referring to FIG. 1 of the drawings, a digital communication network 10 includes a radio access network 12 including a base station 14 and a base station controller 16. The radio access network 12 is coupled to a switch fabric 18, which may be a circuit switch network or a packet data network that interconnects the radio access network 12 with a public switched telephone network 22 and other radio or data networks 24. The base station 14 provides wireless communication services to mobile stations 20 operating within a coverage area of the base station 14. Preferably the base station 14 operates in accordance with one or more wireless communication standards, including without limitation a direct sequence code division multiple access (DS-CDMA) system operating in accordance with the IS-2000 3G standard.

For any end-user, i.e., mobile station 20, the $i^{th}$ chip of an IS-2000 3G spread digital signal S can be modeled as:

$$S_i=(Pp_i+jDd_iw_i)c_i$$

and consists of a pilot component, $Pp_i$; and a data-bearing component, $Dd_iw_i$, where P and D are the corresponding amplitudes; p is the pilot sequence; d is the interleaved and possibly-repeated coded information sequence; w is the Walsh-code sequence corresponding to the data-bearing component; and c denotes the product of the short and long pseudo-random noise (PN) sequences.

The signal S goes through a pulse-shaping filter for transmission over the air and is received by a receiver, e.g., the signal S is transmitted by mobile station 20 and is received by base station 14. The data from each receiver antenna at base station 14 is then match filtered and sampled; at the chip rate, the result for a particular finger is:

$$r_i:=s_ih_i+ISI_i+TN_i+MAI_i$$

where h is the complex-valued channel coefficient; ISI is inter-symbol interference; TN is the receiver thermal noise; and MAI is multi-access interference.

The ultimate goal of the receiver is the recovery of the coded information sequence, d. In a MUD receiver incorporating IC, the MAI is subtracted from the received signal to form a "cleaned" signal from which d may be recovered. Actually, it is an estimate of the MAI that is subtracted. Estimating MAI, i.e., estimating r, requires estimating both S and d. Previously "hard" estimates. +1, −1, have been used for d. In accordance with a preferred embodiment of the invention, a soft estimate of d is provided.

To estimate r, $h^{(0)}$ and $d^{(0)}$ denote the despread pilot component and the despread data component, respectively. An estimate $h^{(1)}$ of Ph is obtained by passing $h^{(0)}$ through a channel estimation filter f, i.e., $h_i^{(1)}:=(f* h^{(0)})i$, where * denotes discrete convolution.

The soft data estimates $d_i^{(1)}$ are obtained as follows. First, the $d_i^{(0)}$, generated by despreading the data component are phase compensated using the $h_i^{(1)}$, $$\hat{d}_i := \sum_{a=1}^{A}\sum_{m=1}^{M_a} d_{a,m,i}^{(0)}(h_{a,m,n(i)}^{(1)})^*$$

where A is the number of receiver antennas; $M_a$ is the number of fingers assigned to resolved rays or multi-path components for antenna a; and x* denotes the complex conjugate of x. Second, applying a simplifying assumption that $ISI_i$, $TN_i$, $MAI_i$, and the estimation errors in $h_i^{(1)}$ are all uncorrelated and Guassian, then $$\hat{d}_i=j\mu d_i+\epsilon_i$$

where $\mu>0$ and $\epsilon_i$ denotes a complex-valued, Gaussian random variable whose independent components have mean zero and variance $\sigma^2$. Under this assumption, the conditional expectation of $d_i$ given $\hat{d}_i$ is $E[d_i|\hat{d}_i]=\tan h(\mu Im\{\hat{d}_i\}/\sigma^2)$. Third, $\mu$ and $\sigma^2$ are estimated on a PCG-by-PCG basis as:

$$\sigma^2 := 1/(i_2-i_1)\sum_{i=i_1}^{i_2}(Re\{\hat{d}_i\})^2$$

$$x = 1/(i_2-i_1)\sum_{i=i_1}^{i_2}(Im\{\hat{d}_i\})^2$$

$$\hat{\mu}:=|x-\hat{\sigma}^2|_{1/2}$$

where $i_1<=i<=i_2$ includes the indices of all coded bits within a specific PCG.

Although the tan h function may be used, in a preferred implementation of the invention, the tanh function is approximated by an applied function t; hence the soft data estimate of $d_i$ is:

$$d_i^{(1)}:=t(\hat{\mu}Im\{\hat{d}_i\}/\sigma^2)$$

Figure 2:
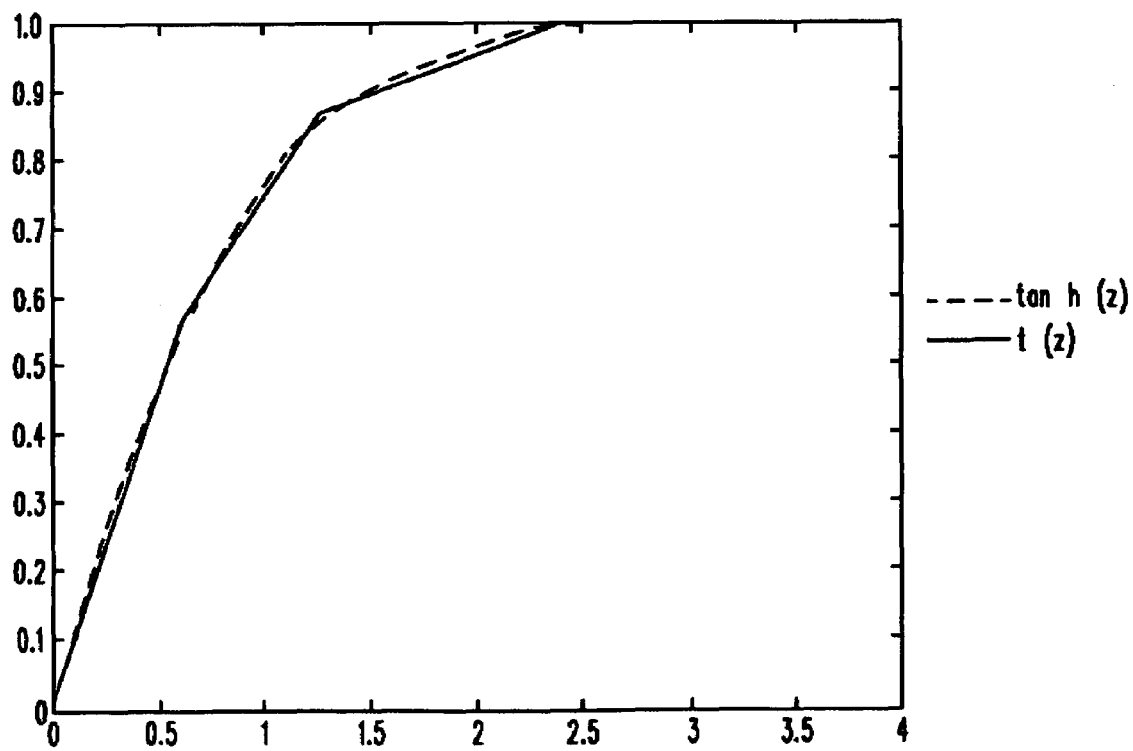
FIG. 2 is a graph illustrating a piece-wise linear function employed in a preferred embodiment of the invention.

A preferred choice of the applied function t is a piece-wise linear function: for $z \in [0,2.4]$, this t is obtained by linear interpolation using the (z, t(z))-pairs (0,0), (0.625,0.5721), (1.25,0.8658), and (2.4, 1); for z>2.4, t(z):=1; finally, for z<0, t(z) :=−t(−z). The function t is illustrated in FIG. 2.

As will be appreciated from the foregoing discussion, the estimation $\hat{d}_i$ includes an imaginary component and a real component, where the imaginary component is both signal and noise and the real part is only noise. The estimate $\hat{\sigma}^2$ is an estimate of the average noise power while the estimate x is an average of the signal and noise power. Thus, the estimate $\mu$, the difference of x and $\hat{\sigma}^2$, is the signal. It will be further appreciated that the estimation $\hat{d}_i$ is obtained at the chip level, and hence, IC is accomplished at the chip level. A re-spreading operation is performed to generate the "cleaned" signal for the final estimation of the coded information sequence d.

Figure 3:
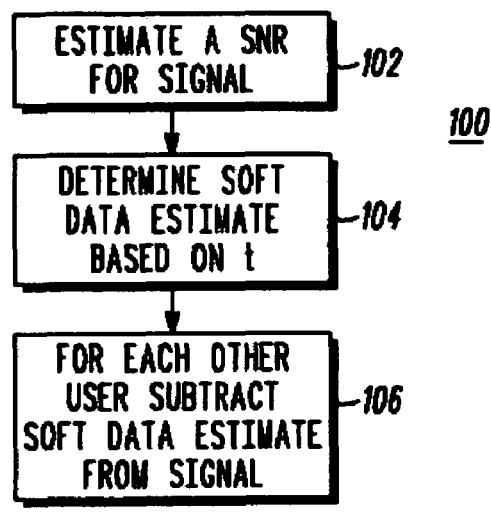
FIG. 3 is a flow chart illustrating a method of providing data estimates in accordance with a preferred embodiment of the invention.

Referring now to FIG. 3, a method 100 of providing a data estimate begins at step 102 by estimating a signal-to-noise ratio including a first signal term $\sigma^2$ and second signal term $\mu$ for a received baseband signal. At step 104, an applied function t is used to determine the soft data estimate on a PCG-by-PCG basis for each user. At step 106, the soft data estimates of each other user is subtracted from the received baseband signal. The result is the SNR for the particular user of interest is improved.

For partial interference cancellation, the estimate of $r_i^{(1)}$ of $s_ih_i$ may be written as:

$$r_i^{(1)}:=(\alpha_p p_i'+j\alpha_d \eta d_i^{(1)}w_i)c_i h_{n(i)}^{(1)}$$

where $\alpha_p$ and $\alpha_d$ and ad are the partial cancellation coefficients $p_i'=1$ over the first ¾ of each PCG (i.e over the known portion of p) and $p_i=0$ otherwise; $\eta:=D/P$; and $d_i^{(1)}$ is an estimate of $d_i$. Since the data bits $d_1$ have a higher rate than the output samples of the filter $f$, the mapping n(.) is needed to match them appropriately: if the sampling rate of $f$ is $v_i$ Hz and the $d_i$ have a rate of $v_2$ bits/s, then $n(i):=\lfloor iv_1/v_2 \rfloor$ (hence, each channel estimated is used for the phase compensation of $v_2/v_1$ bits).

In accordance with a further preferred embodiment of the invention, the partial interference cancellation coefficients $\alpha_p$ and $\alpha_d$ may also be estimated on a PCG-by-PCG basis. For the purpose of this embodiment, a hard estimate of $d_i^{(1)}$ is used and is $$d^{(1)}i:=sgn(Im\{\hat{d}_1\})$$

by recalling that the imaginary part of the $\hat{d}_i$ represents only signal, taking the sign of $\hat{d}_i$ is typically used as an estimate. The estimation error of the signal is $(r_1-r_i^{(1)})$, and taking the partial derivative of the estimation error for each of $\alpha_p$ and $\alpha_d$, respectively, and solving for $\alpha_p$ and $\alpha_d$ provides the following:

$$\alpha_p = \frac{1}{1+\rho^2/|Ph(iT_c)|^2}$$

and $$\alpha_d = \frac{2\beta-1}{1+\rho^2/|Ph(iT_c)|^2}$$

where $\beta:=P[d_i=d_i^{(1)}]$, i.e., the probability that the data estimate is correct and $\rho^2$ is the variance of the error in estimating the product $Ph(.)$, and wherein $T_c$ is the duration of the chip.

In accordance with the preferred embodiments of the invention, $\beta$ is determined in real time. Using the simplified statistical model for $\hat{d}_i$ from above, the conditional probability density function of $d_i^{(1)}$ given $d_i$ is Guassian with mean $\mu d_i$ and variance $\sigma^2$. Then, assuming that $P[d_i=1]=P[d_i=-1]=\frac{1}{2}$, it follows that $$1-\beta = P[d_1 \neq d_i^{(1)}]$$
$$= \left(1/\sqrt{\pi}\int_{-\infty}^{-\mu/\sqrt{2\sigma}} e^{-t^2}\,dt\right)$$
$$= \text{erfc}(\mu/\sqrt{2\sigma})/2$$

where $$\text{erfc}(x) := \left(2/\sqrt{2\pi}\int_x^\infty \exp(-t^2)\,dt\right).$$

Figure 4:
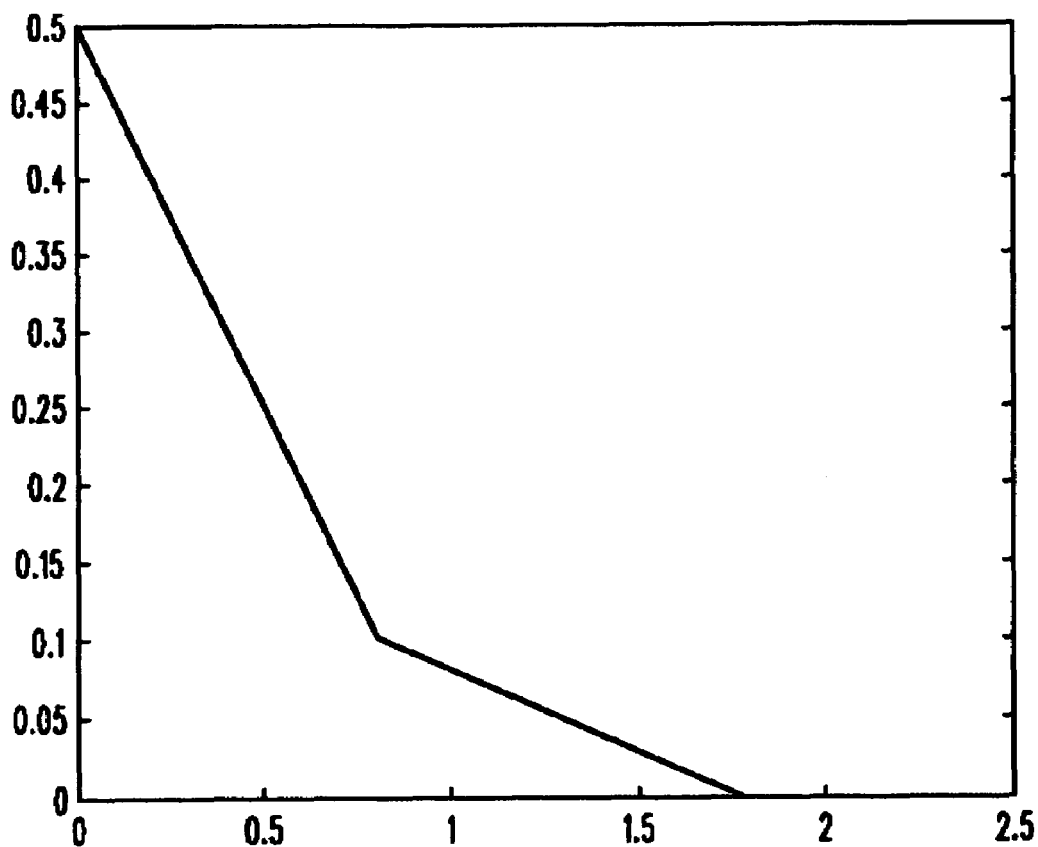
FIG. 4 is a graph illustrating a piece-wise linear function employed in a preferred embodiment of the invention.

The unknown parameters $\mu$ and $\sigma$ are estimated on a PCG-by-PCG basis as set forth above. Then an estimate of $\beta$ is:

$$\hat{\beta} := 1 - t(\hat{\mu}/\sqrt{2\hat{\sigma}})$$

where the approximation $e(x) \approx \text{erfc}(x)/2$ is introduced for practical implementation. A simple choice for the function $e$ is a piece-wise linear function, for $x \in [0,1.8]$, $e$ is obtained by linear interpolation using the $(x,e(x))$-pairs $(0,0.5)$, $(0.8, 0.1)$, and $(1.8, 0)$; for $x>1.8$, $e(x):=0$, as shown in FIG. 4.

From the above equations for $\alpha_p$ and $\alpha_d$, the choice of $(\alpha_p, \alpha_d)$ in accordance with the preferred embodiment of the invention is $$(\alpha_p, \alpha_d) = \left(\frac{1}{1+\gamma}, \frac{2\hat{\beta}-1}{1+\gamma}\right)$$

where $\gamma$ is $$\gamma := \frac{T_a\|f\|^2}{N|h_{a,m,n(i)}^2|^2}$$

where $\|f\|$ denotes the $l_2$-norm of the channel estimation filter $f$; $T_a$, the received power at antenna $\alpha$ averaged over the PCG corresponding to $\hat{\beta}$ and N, the number of pilot chips used at a time for dispreading the pilot component to obtain $h^{(0)}$.

Figure 5:
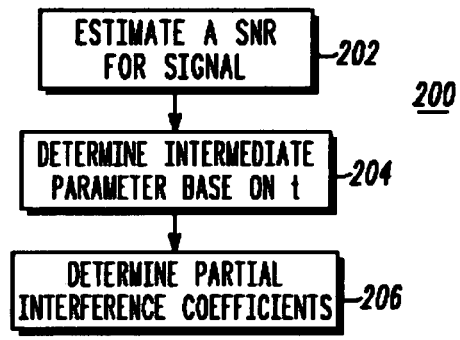
FIG. 5 is a flow chart illustrating a method of providing partial interference cancellation coefficients in accordance with a preferred embodiment of the invention.

Referring now to FIG. 5, a method 200 of providing partial interference coefficients begins at step 202 by estimating a signal-to-noise ratio including a first signal term $\sigma^2$ and second signal term $\mu$ for a received baseband signal. At step 204, an applied function t is used to determine an intermediate parameter on a PCG-by-PCG basis. At step 206, the intermediate parameter is used to determine a first partial interference coefficient and a second partial interference coefficient, i.e., $\alpha_p$ and $\alpha_d$.

One of skill in the art will appreciate that partial interference cancellation may employ the data estimates and/or the partial interference coefficients determined on a PCG-by-PCG basis in accordance with the preferred embodiments of the invention. In this manner, characteristics of the channel itself, e.g., fading conditions or interference, are accounted for and optimized in the data estimates and coefficients. Systems utilizing hard data estimates and/or fixed coefficients do not account for actual channel conditions. The present invention provides optimal values in real time to improve the performance of a receiver utilizing either interference cancellation (IC) or partial interference cancellation (PIC).

Figure 6:
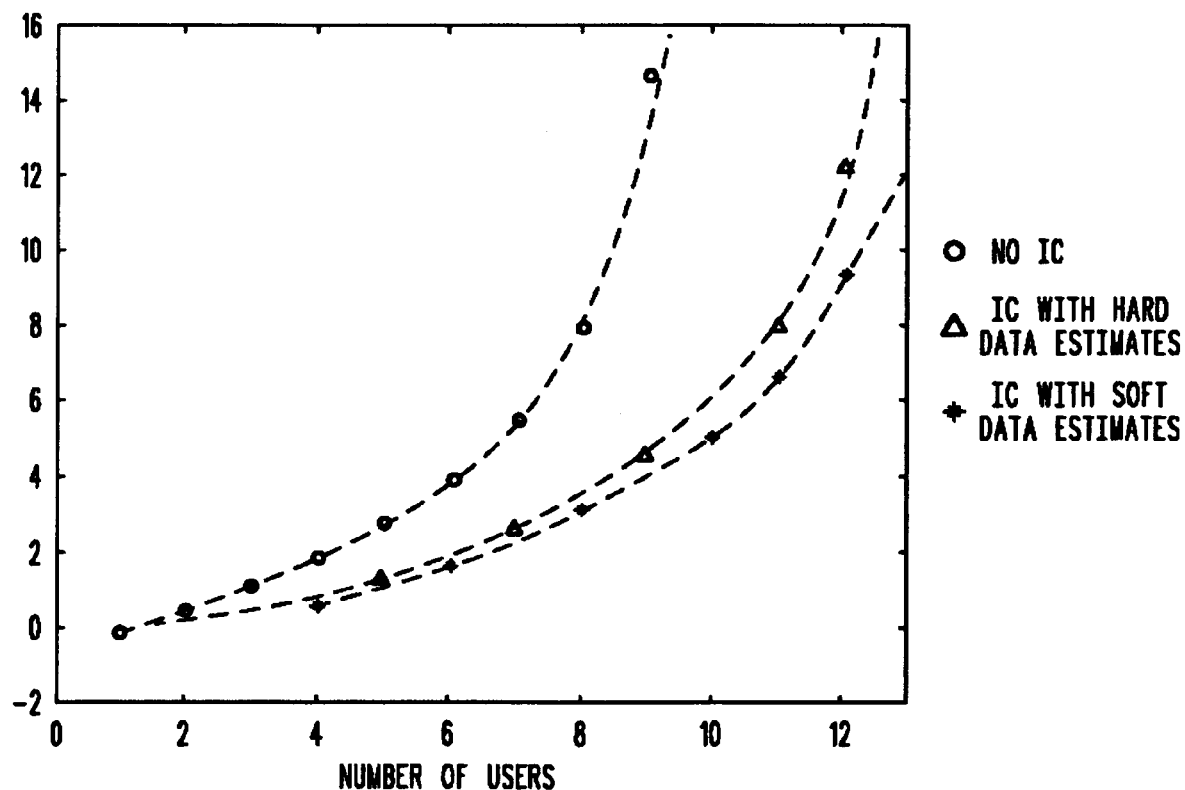
FIG. 6 illustrates plots comparing performance of a system constructed in accordance with the preferred embodiments of the invention with prior art systems.
Figure 7:
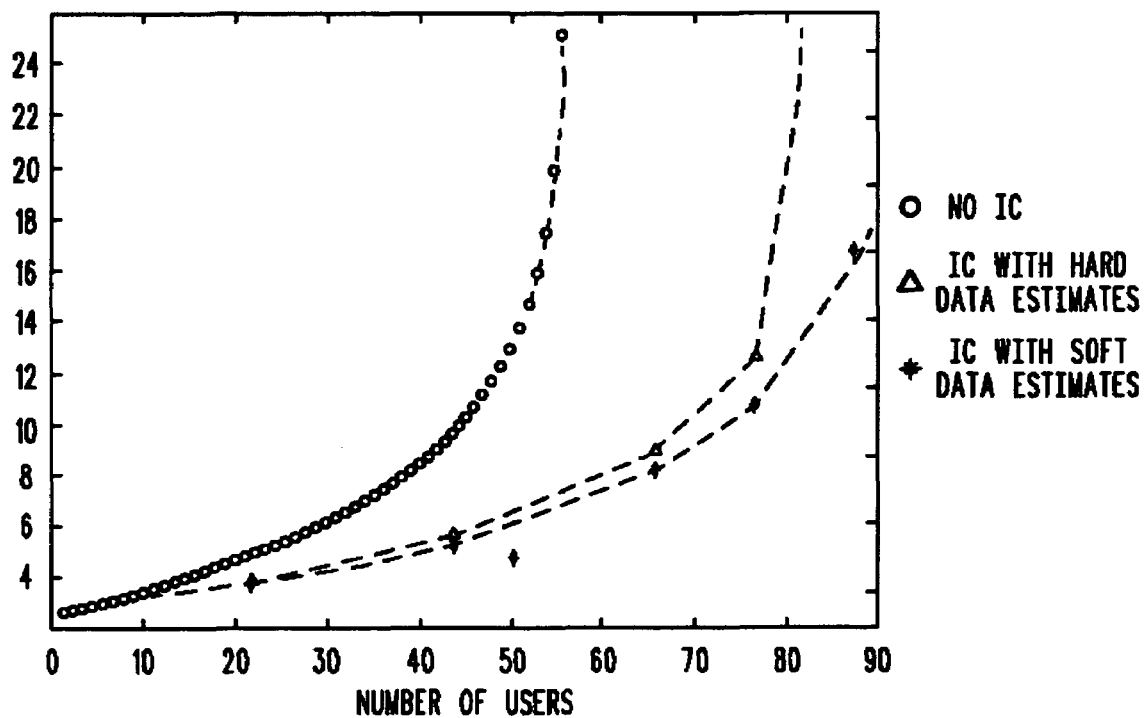
FIG. 7 illustrates plots comparing performance of a system constructed in accordance with the preferred embodiments of the invention with prior art systems.

For example, FIG. 6 and FIG. 7 illustrate, by simulation, the required $E_b/N_t$ for a given QoS discussed below, where $E_b$ is the received energy per bit and $N_t$ is the receiver's thermal-noise power. The plots show the performance of one stage of IC when $d_i$ is estimated in accordance with the preferred embodiments of the invention, hard data estimates and no IC as indicated by the legend. FIG. 6 represents 153.6 kbps, circuit-switched, supplemental service, for a QoS of 15% FER with turbo code, Pedestrian A channel with a mobile speed of 3 km/h. FIG. 7 represents 9.6 kbps, circuit switched, fundamental service for a QoS of 1.5% FER with convolutional code, a flat, Rayleigh-fading channel with a mobile speed of 30 km/h. In both examples, the chip rate was 1.2288 Mcps, the receiver had two antennas with one finger per antenna, the carrier frequency was 2 GHz, and the power control had a delay of 1.25 ms (corresponding to one PCG) and an error rate of 4%. The results show that the benefit of using soft data estimates in accordance with the preferred embodiments of the invention, rather than hard data estimates, becomes significant at high system loads.

Figure 8:
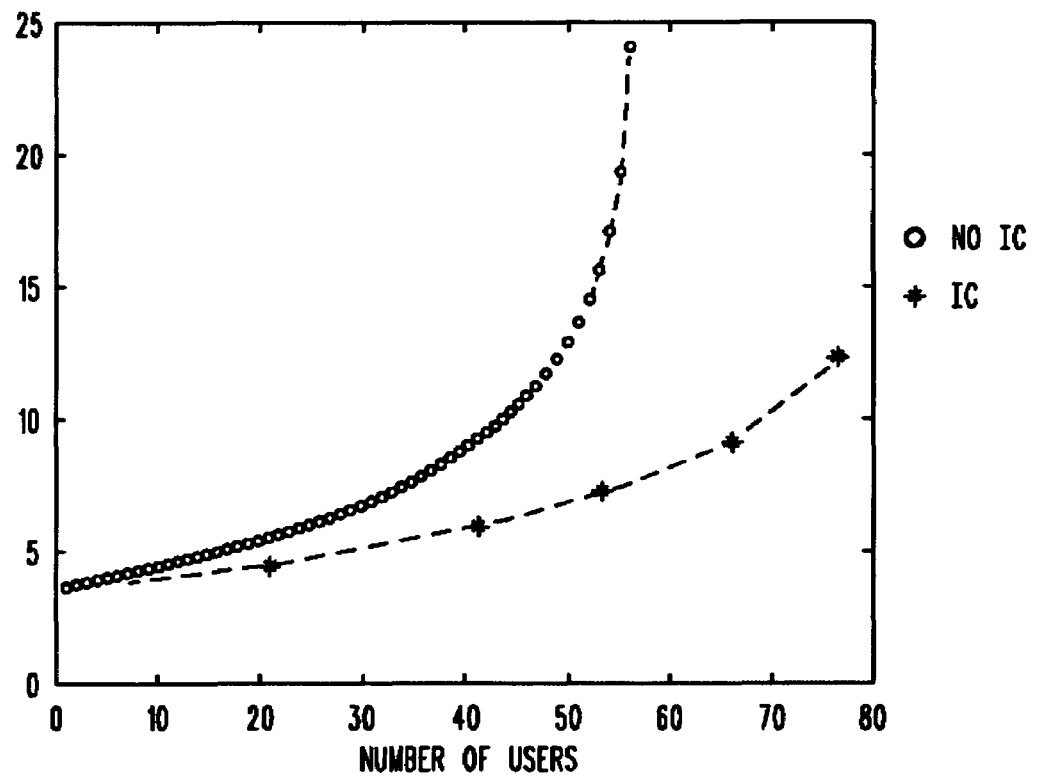
FIG. 8 illustrates plots comparing performance of a system constructed in accordance with the preferred embodiments of the invention with prior art systems.

FIG. 8 shows, by simulation, the required $E_b/N_t$ for a QoS of 1.5% FER in one stage IC when $\alpha_p$ and $\alpha_d$ are estimated in accordance with a preferred embodiment of the invention in comparison with no IC according to the legend. The simulation is for 9.6 kbps, circuit-switched, fundamental service with convolutional code, a flat, Rayleigh-fading channel with a mobile speed of 30 km/h. The chip rate was 1.2288 Mcps, the receiver had two antennas with one finger per antenna, the carrier frequency was 2 GHz, and the power control had a delay of 1.25 ms (corresponding to one PCG) and an error rate of 4%.

While FIGS. 6-8 demonstrate distinct advantages of the invention, one of skill in the art will appreciate that the invention has numerous additional advantages. For example, the system incorporating a receiver in accordance with the preferred embodiments of the invention offers the potential for CDMA capacity increase for and lower transmit power for a given QoS. Lower transmit powers may be correlated to increased battery life at the mobile station. The invention has been described in terms of several preferred embodiments, and the invention may be otherwise embodied without departing from its fair scope set forth in the subjoined claims.

The invention claimed is:

1. A method of interference cancellation in a multiple access communication channel comprising:
    receiving a signal including at least a first data component for a first channel within the multiple access communication channel and a second data component for a second channel within the multiple access communication channel on the communication channel;
    determining a characteristic of one stage of the multiple access communication channel;
    estimating an interference factor caused by the second data component received on the multiple access communication channel based upon an approximation of the characteristic and comprises applying a function to the characteristic and wherein the function comprises a piece-wise linear estimation of a hyperbolic tangent;
    using the interference factor to cancel the second data component from the signal; and
    recovering the first data component from the signal.

2. A method of interference cancellation in a multiple access communication channel comprising:
    receiving a signal including at least a first data component for a first channel within the multiple access communication channel and a second data component for a second channel within the multiple access communication channel on the communication channel;
    determining a characteristic of one stage of the multiple access communication channel;
    estimating an interference factor caused by the second data component received on the multiple access communication channel based upon an approximation of the characteristic and comprises applying a function to the characteristic and wherein the function comprises a piece-wise linear estimation of a probability of error function;
    using the interference factor to cancel the second data component from the signal; and
    recovering the first data component from the signal.

3. In a receiver including interference cancellation in a multiple access communication channel, the receiver adapted to receive a signal for the communication channel including a first data component for a first channel within the multiple access communication channel and a second data component for a second channel within the multiple access communication channel, a method of providing a data estimate comprising the steps of:
    estimating a signal-to-noise ratio for the signal; applying a function to the signal-to-noise ratio to determine an approximation of a soft data estimate caused by the second data component received on the multiple access communication channel on a power control group by power control group basis for each of the first data component and the second data component; wherein the function comprises a piece-wise linear estimation of the hyperbolic tangent
    subtracting from the aggregate received signal the signal estimate involving soft data estimate of the second data component.

4. In a receiver including partial interference cancellation in a multiple access communication channel, the receiver adapted to receive a signal for the communication signal including a first data component for a first channel within the multiple access communication channel and a second data component for a second channel within the multiple access communication channel, a method of providing a partial interference cancellation coefficient comprising the steps of:
    estimating a first signal term and a second signal term of the signal; applying a function to a signal-to-noise ratio to determine an approximation of an intermediate parameter caused by the second data component received on the communication channel on a power control group by power control group basis wherein the function comprises a piece-wise linear estimation of a probability of error function, and
    using the intermediate parameter to determine a partial interference cancellation coefficient.

* * * * *